March 11, 1941.   J. A. MULLER   2,234,350

HOSE AND COUPLING STRUCTURE

Filed July 15, 1939

INVENTOR.
JOHN A. MULLER
BY
ATTORNEYS

Patented Mar. 11, 1941

2,234,350

UNITED STATES PATENT OFFICE 2,234,350

HOSE AND COUPLING STRUCTURE

John A. Muller, Paterson, N. J., assignor to United States Rubber Company, New York, N. Y., a corporation of New Jersey Application July 15, 1939, Serial No. 284,581

4 Claims. (Cl. 285—71)

This invention relates to improvements in high pressure hose and more particularly to end couplings therefor.

Heretofore it has been difficult to produce high pressure hose and end coupling constructions for use in high pressure drilling operations, such as rotary drilling operations in oil fields, which was strong, durable and efficient and, at the same time, of economic construction and of compact arrangement without reducing the internal diameter at any point in the completed structure. Conventional hose and end coupling constructions which functioned satisfactorily for low pressure ranges of operation were found to be totally unsuited and inadequate for the extremely high pressures of the present day oil well drilling operations; for example, ranges as high as or higher than one thousand pounds per square inch. The demands for these greatly increased operating pressures and more efficient well drilling apparatus have necessitated the production of improved rotary hose and end coupling constructions.

The improved rotary hose and end coupling constructions of my invention substantially eliminate the objectionable features of former constructions by producing strong, durable, efficient and economical structures which are exceedingly compact and which at the same time maintain uniform internal diameters or bores at all points throughout their entire lengths. I accomplish my invention by forming rotary hose structures having laminations of rubber composition, wire and rubberized fabric and embedding within the laminations thereof elongated tubular portions of end coupling assemblies so as to be, upon subsequent vulcanization, firmly secured relative to each other and form structures of exceptional strength and durability.

The parts of my hose and end coupling assemblies are so constructed and arranged that internal pressure at the junctions thereof tends to increase the resistance of the constructions to leakage and failure, throughout the normal operating limits for which they are intended, directly in proportion to the increase in internal pressure within the hose. The internal pressure tends to force the inner wall or carcass of the laminated hose into more intimate and more intense engagement with parts of its associated end coupling assembly, so that the greater the pressure becomes within the hose the greater the sealing effect between the hose and coupling assembly becomes.

In order to insure a perfect seal between the end coupling assembly and the laminated hose structure throughout the entire range of operating pressures, I have found it desirable to employ an expansible construction, which may take the form of a metallic expansion ring operable against part of the hose or a tubular section of soft, flexible and yieldable rubber composition at the free end of the inner wall portion of the hose, for forming a permanent seal between the hose and the coupling assembly at all times. In such structures, as the pressure builds up the expansible construction becomes operative to prevent seepage of fluid between portions of the coupling assembly and the hose. Subsequently, as the pressure becomes greater, this pressure tends to press the inner wall or carcass into more intense engagement with the coupling assembly and thus aids the expansible construction in forming a strong and efficient seal and a strong composite structure. After the hose and coupling assemblies are completely assembled they may be easily and conveniently installed in oil well drilling apparatus as they have no external clamps or other projecting portions to hinder in such operations. They are also efficient during oil well drilling operations since no constrictions or obstructions are present within the structure to impede the fluid flow and no maintenance of couplings or clamps is necessary from attendants thereof.

The invention will more readily be understood from the following descriptions of certain present preferred embodiments thereof taken in conjunction with the accompanying drawing, in which.

Figures 1, 2:
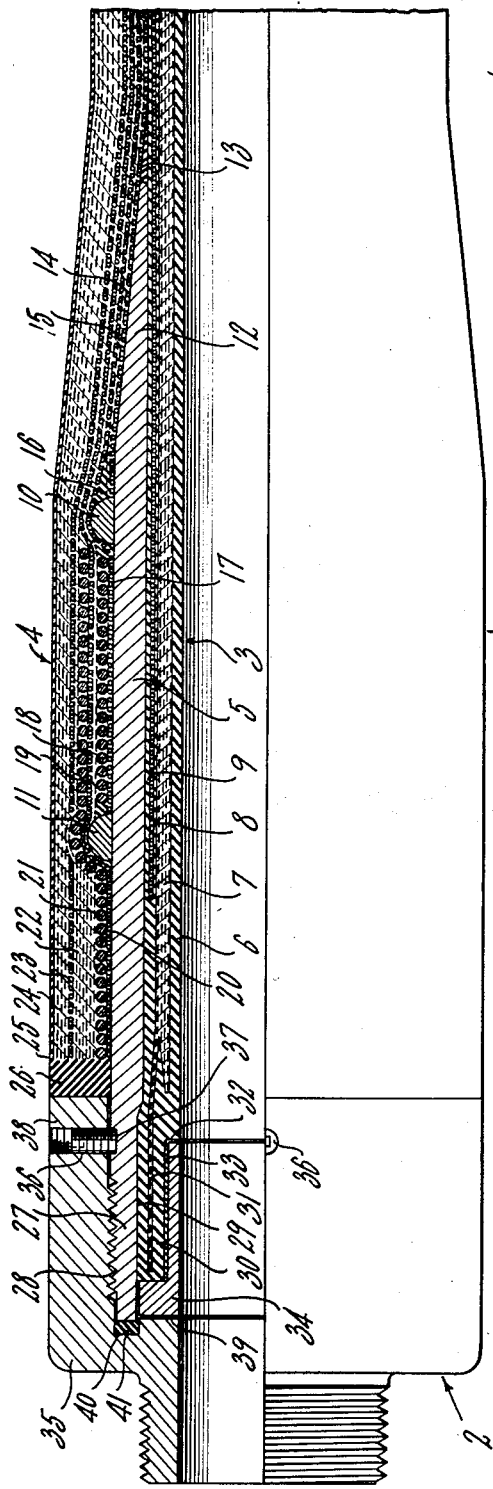
Fig. 1 shows a side view, partly in section, showing a preferred embodiment of my laminated hose and end coupling construction.
Fig. 2 is a side elevational view, partly in section, showing a modified form of my invention.

Referring to the drawing and in particular to Fig. 1, there is shown a high pressure hose 1 and an end coupling assembly 2 joined together to form a complete substantially smooth continuous structure. The end of hose 1 comprises an inner laminated tubular wall or carcass 3 and an outer laminated tubular wall 4 having their free ends positioned upon opposite sides of an elongated tubular nipple portion 5 of the end coupling assembly 2 and so constructed and arranged as to be firmly secured relative thereto. The inner wall or carcass 3 of the hose comprises an inner surface layer 6 of rubber composition, which may be formed upon an elongated mandrel of proper size and shape. About the layer 6 are formed a plurality of layers of reinforcing fabric 7 and a layer 8 of metallic reinforcing which are arranged to terminate inwardly of the free end of the wall 3 so as to be completely covered and sealed by rubber composition. A second layer of rubber composition 9 is located upon the reinforcing layer 8 and forms a substantially smooth outer cylindrical surface of the inner tubular wall or carcass 3 of the hose 1.

The tubular nipple portion 5 of the coupling assembly 2 is of such size as to fit closely about the outer surface of the carcass 3. Formed upon the outer surface of the nipple 5 are spaced circumferentially extending rings or ribs 10 and 11 which serve as anchoring means for the outer tubular wall 4 of the hose. These anchoring rings or ribs 10 and 11 are, as shown in Fig. 1, preferably of semi-circular shape in cross-section and are of such size as to fit closely about the outer surface of the nipple 5 and are welded in place thereon to form a substantially integral part of the nipple. The inner end of the nipple 5 is tapered as indicated at 12 and a filler of rubber composition or other suitable material 13 is placed at the end of the tapered portion 12 so that the laminations of the outer wall 4 may fit smoothly thereover and form a substantially smooth and gradual enlargement about the coupling assembly as the carcass 3 and wall 4 merge in the hose body.

The outer wall portion 4 comprises a metallic reinforcing layer 14 and a layer of rubberized fabric 15 which extend from the hose proper over the filler 13 and tapered portion 12 and as far as the anchoring ring 10. A filler 16 of rubber composition, or the like, is placed over the end of the layer 15 and adjacent the anchoring ring 10 for forming a smooth surface for the subsequent layers of the hose structure. A second metallic reinforcing layer 17 is placed over the layer 15, the filler 16 and the anchoring ring 10 and extends along the outer surface of the nipple 5 as far as the second anchoring ring 11. The layer 17 is firmly bound in place between the anchoring rings 10 and 11 by a heavy wrapping of wire 18 which extends substantially the full distance between these rings. A layer of reinforced fabric 19 is placed over these assembled parts of the laminated wall 4 and over the anchoring ring 11. Upon this layer 19 and an adjacent exposed portion of the nipple 5, a third metallic reinforcing layer 20 is placed. The end of this reinforcing layer 20 is firmly bound in place upon the nipple 5 and the layer 19 by a second wrapping 21 which extends over the layer 20 from its free end to the anchoring ring 10 so that no longitudinal movement of the nipple relative to the layer 20 can take place. Over these parts of the wall 4 is placed a filler 22 of rubberized fabric to render the outer surface of the partially completed structure comparatively smooth. Additional layers 23 and 24 of metallic reinforcing and rubberized fabric are then placed upon the hose to produce the size and strength desired and a relatively smooth surface to receive the outer cover 25 of rubber composition which forms the wear surface of the hose.

It will be apparent that as many alternate layers of metallic reinforcing and rubberized fabric as are desired may be added to the structure of the laminated wall 4 prior to the cover 25 in order to produce the strength, size and contour required for the particular use for which the completed hose and end coupling construction is intended. A collar 26 of rubber composition is formed upon the nipple portion 5 of the hose coupling assembly 2 so as to become, upon vulcanization, an integral part of the wall 4 and form a seal for the laminations thereof. The collar 26 also forms an abutment for the outer portion of the end coupling assembly 2 when positioned upon the nipple portion 5.

An end portion 27 of the nipple 5, which is free of fabric and rubber composition, extends a substantial distance beyond the collar 26 of the outer wall 4 and has threads 28 formed upon its outer surface and a circumferential recess 29 formed upon its inner surface. A thin tubular end wall 30 of rubber composition is formed as an integral extension of the inner wall 3 and has embedded and sealed therewithin a tubular layer 31 of rubberized fabric. This layer 31 is a continuation of one of the layers of the rubberized fabric 7 forming the body portion of the inner wall 3 of the hose. The wall or extension 30 is of substantially less thickness than the main part of the wall or carcass 3 so that a wide recess 32 is formed within the end of the carcass 3. A metallic expansion ring 33 of proper size is positioned within this recess 32 and then firmly expanded into place by any suitable expansion tool so as to force the extension 30 into the circumferential recess 29 and into positive engagement with the inner surface of the nipple portion 5.

An expansion ring protector 34 of predetermined size and shape is arranged to fit within the nipple portion 5, the expansion ring 33 and the end of the wall 3 of the hose so as to form with the inner wall 3 a smooth interior bore for the hose construction which is of uniform diameter throughout the entire length of the assembled structure.

The coupling assembly 2 is provided with a coupling member 35 for engagement with a conventional pipe coupling and has internal threads for engagement with the threads 28 upon the nipple 5. This coupling member 35 is also provided with threaded recesses and hollow head set screws 36 for engagement with recesses 37 in the extended end portion 27 of the nipple 5. The coupling member 35 has its free edge formed as a shoulder 38 arranged to abut the sealing ring 26. A second shoulder 39 is formed on the inner part of the member 35 and is arranged to abut and retain the ring protector 34 in place when the structure is assembled. A circumferential recess 40 is located in the member 35 adjacent the shoulder 39 and is arranged to receive a packing or sealing ring 41 therein. The nipple portion 5 extends into this recess 40 and abuts the packing ring 41 so that a tight and durable seal is formed at this point in the assembly. Internal pressure within the hose and coupling have a tendency to increase the sealing effect between this sealing ring and adjacent portions of the coupling assembly.

Referring in particular to Fig. 2, I have shown a somewhat similar construction but which is provided with internal set screws and has no recess such as recess 29. In this modification the nipple portion 5 is embedded in the laminations of the hose structure 1 in a manner similar to that shown in Fig. 1 and an extended free end portion 45 of this nipple is provided with threads 46. These threads are made of standard size for the reception of a standard pipe coupling member. A thin tubular end portion 47 of the inner wall or carcass 3 is firmly pressed into engagement with the extended nipple portion 45 by an expansion ring 48. A ring protector 49, which is arranged to fit snugly within the extended nipple portion 45 and the ring 48, is provided with a plurality of set screws 50 arranged to engage the inner surface of the extended nipple portion 45 and hold the protector ring in place therewithin. By this arrangement a continuous uniform internal bore is provided which extends throughout the full length of the hose and end coupling assembly. The outer end of the extension 45 is arranged to project slightly, as indicated at 51, and may be machined so as to engage evenly a packing ring similar to that shown at 40 in Fig. 1. If desired, however, the outer end might be circumferentially beveled or otherwise shaped to form a complementary shoulder for a part of a conventional pipe coupling member.

Figure 3:
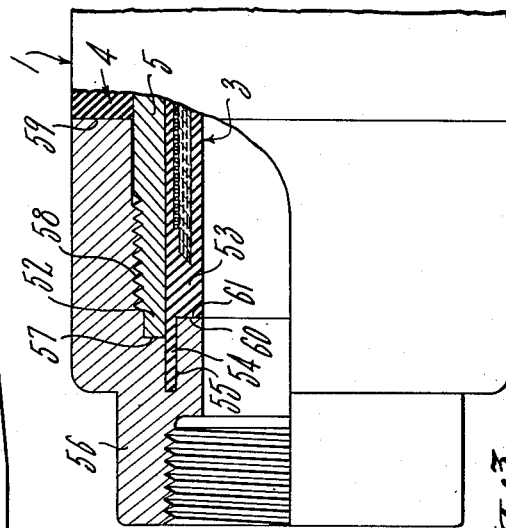
Fig. 3 is a side elevational view, partly in section, showing a second modified form of my invention.

Fig. 3 shows a modified form of my invention wherein the end portion of the nipple 5 is shown at 52 and the inner wall or carcass 3 of the hose 1 has its free end modified by use of a tubular section 53 of soft, flexible and yieldable rubber composition. This tubular section is employed instead of an expansion ring for forming a seal between the hose and coupling assembly. The nipple portion 5 is embedded within the laminations of the hose structure in a manner similar to that heretofore described. The tubular section 53 is provided at its free end with a thin tubular extension 54 also of soft, flexible and yieldable rubber composition which is arranged to extend into a deep circumferential recess 55 formed in a coupling member 56. The coupling member 56 is provided with an intermediate shoulder 57 for engaging the free end portion 52 of the nipple 5 and is also provided with internal threads 58 for engaging complementary threads upon the extended end portion 52 of the nipple 5. The coupling member 56 is provided with an outer abutment 59 for engaging the end of the outer wall 4 of the hose and an inner abutment 60 for engaging a shoulder 61 formed in the soft tubular section 53 of rubber composition.

When it is desired to place the hose and end coupling assembly of the embodiment, shown in Fig. 1, in operation the extension 30 of the inner wall or carcass 3 is held in intimate engagement with the inner surface of the nipple portion 5 within the recess 29 by the expansion ring 33 in order to form at all times a liquid tight seal between the hose carcass and the wall of the nipple portion 5. When any pressure is exerted upon the hose and end coupling construction by fluid within the hose it tends to expand the inner wall or carcass 3 thereof against the interior surface of the nipple 5 and thereby tends to increase this intimate engagement between the hose extension 30 and nipple 5. The packing ring 41 at the same time forms a tight joint between the extended portion 27 of the nipple 5 and the coupling member 35 so that a tight connection is also formed at this location. In this way all parts of the hose and coupling assembly are securely constructed and arranged to withstand high internal pressures when in use during oil well drilling operations.

The construction shown in Fig. 2 functions in a somewhat similar manner to that shown in Fig. 1 except that the extended end portion 45 of the coupling assembly is adapted to be connected directly to a standard pipe coupling. The expansion ring 33 holds the tubular section 47 in firm engagement with the extended end portion 45 of the nipple 5 and the expansion ring protector 49 fits snugly into these parts of the structure. The protector 49 is equipped with set screws to secure it in place within the extended portion 45 and when so arranged it forms with the wall 3 of the hose a substantially uniform continuous interior bore for the hose and coupling assembly throughout the full length of the structure.

In the construction shown in Fig. 3 the forming of the section 53 and the extension 54 of soft, flexible and yieldable rubber composition at the free end of the wall 3 and the fitting of these elements snugly into engagement with the portions 55 and 60 of the coupling assembly produces a simple but secure seal between the hose and the coupling assembly. The rubber composition of the section 53 and extension 54 tend to yield readily when subjected to the slightest internal pressure, and since they are normally in tight engagement with adjacent portions 52 and 56 of the coupling assembly the section and extension of soft rubber composition tends to more intensively seal the joint between the coupling assembly and the hose. This arrangement is such as to maintain a tight seal throughout the entire range of operating pressures to which the structure is subjected.

Thus from the foregoing description it will be seen that in each form of my invention I have produced structures which are strong and efficient. These constructions are such that the greater the internal pressure becomes the greater the sealing effect becomes between the hose and end coupling assemblies. In each of these forms of construction it is apparent from the drawing that the internal diameter throughout the entire length of the hose and coupling assembly remains constant and does not, at any place, impede the flow or reduce the internal bore of the construction. And also in each form of construction the external diameter of the hose and end coupling assembly is but slightly larger than the external diameter taken at other points along the hose. No objectionable projections are present upon the outer surface of the hose assembly to interfere with its efficient operation and its ease of handling. It is not necessary in the use of the constructions of my invention to adjust or maintain parts of the structure after they have been properly assembled for well drilling operations. The substantially straight cylindrical wall construction of the hose and end coupling constructions of my invention produce structures which may be easily, quickly and economically built without the necessity of shaping and forming irregular parts.

Although the invention has been described in connection with the specific details of preferred embodiments thereof it should be understood that such details are not intended to be limitative of the invention except in so far as is set forth in the accompanying claims.

Having thus described my invention, what I claim and desire to protect by Letters Patent is:

1. A hose and end coupling construction comprising a laminated flexible hose of reinforced rubber composition having inner and outer tubular walls, an elongated rigid tubular nipple having a substantial portion thereof positioned between and firmly bonded to said tubular walls and having a threaded end portion extending axially beyond an end of one of said tubular walls for the reception of a complementary coupling member, said inner tubular wall having a circumferential end section of yieldable rubber composition in engagement with the inner surface of said nipple and said end section having an internal recess, an expansion ring positioned within said recess and forcefully holding said end section in fluid-tight engagement with said nipple, a protecting ring slidably fitting within the end of the tubular nipple and having an axially extending flange fitting within said expansion ring for enclosing said expansion ring between said protecting ring and adjacent portions of the inner tubular wall of the hose, the interior diameters of the protecting ring and the inner tubular wall being equal so as to form a substantially smooth continuous internal bore throughout the entire length of the hose and end coupling construction, and means for retaining said protecting ring in operative position within said nipple.

2. A hose and end coupling construction as defined in claim 1 in which the retaining means for the protecting ring comprises a coupling member in threaded engagement with said nipple and in operable engagement with said protecting ring, and a circumferential sealing ring positioned between the end of said nipple and the coupling member for forming a fluid-tight seal therebetween.

3. A hose and end coupling construction as defined in claim 1 in which the retaining means for the protecting ring comprises a set screw in engagement with said nipple.

4. A hose and end coupling construction as defined in claim 1 in which the retaining means for the protecting ring comprises a coupling member in threaded engagement with said nipple and having an interior portion for engagement with said protecting ring and having an exterior portion in alignment with and abutting the end of said outer tubular wall, and a circumferential sealing ring located between the end of said nipple and the coupling member for producing a fluid-tight seal therebetween.

JOHN A. MULLER.